S. BURROWES.
CURRENT REGULATOR FOR ELECTRIC FURNACES.
APPLICATION FILED OCT. 26, 1920.
1,385,974.
Patented July 26, 1921.
2 SHEETS—SHEET 1.
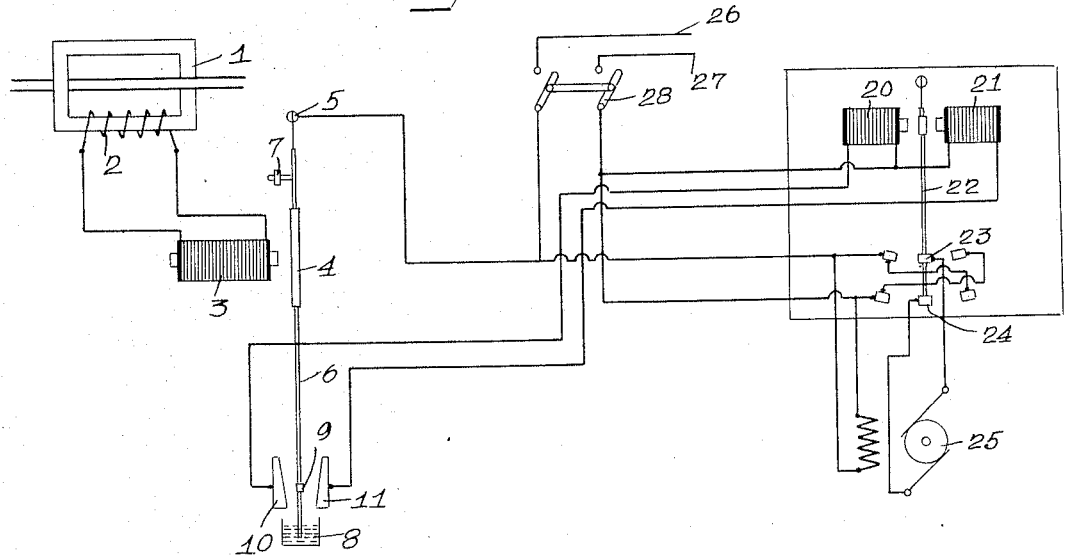
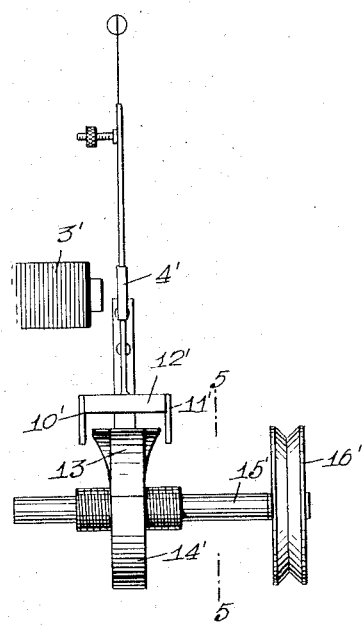
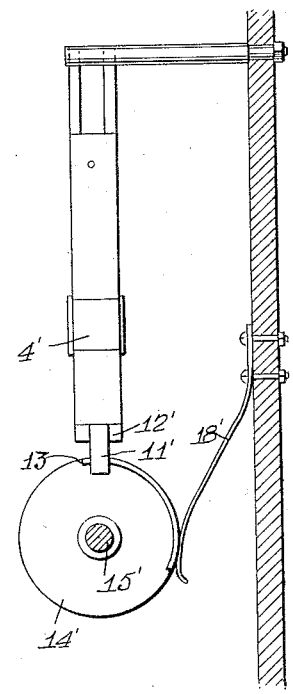
WITNESSES
H. J. Walker
Robert I. Hulsizer
INVENTOR
SIDNEY BURROWES
BY Munn & Co
ATTORNEYS

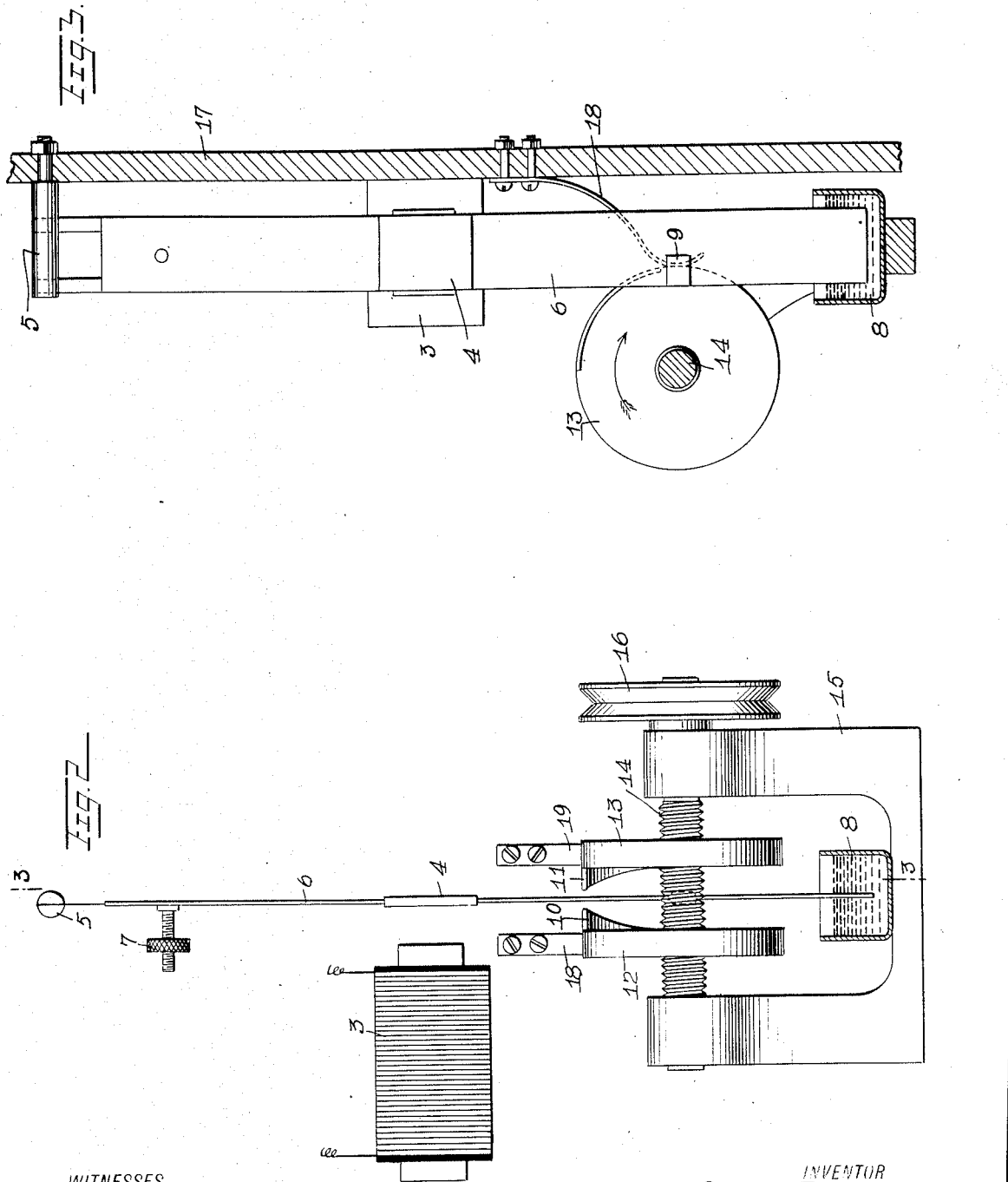

UNITED STATES PATENT OFFICE.

SIDNEY BURROWES, OF NIAGARA FALLS, ONTARIO, CANADA.

CURRENT-REGULATOR FOR ELECTRIC FURNACES.

1,385,974.  Specification of Letters Patent.  Patented July 26, 1921.

Application filed October 26, 1920. Serial No. 419,725.

*To all whom it may concern:*

Be it known that I, SIDNEY BURROWES, a citizen of Great Britain, and a resident of Niagara Falls, Ontario, Canada, have invented a new and Improved Current-Regulator for Electric Furnaces, of which the following is a full, clear, and exact description.

This invention relates to current regulators, and has particular reference to a regulator adaptable to control the flow of current consumed in electric furnaces.

It is an object of the invention to provide a regulator which will maintain the flow of current in an electric furnace as steady as possible.

Another object of the invention is to provide mechanism for controlling current which comprises a very simple device of a minimum number of parts and which is economical to manufacture and efficient in operation.

A further object resides in the provision of mechanism in which the length of the regulating impulse given to the control motor may be adjusted to meet the requirements of the furnace.

A still further object resides in the provision of the particular arrangement and construction of parts hereinafter described and claimed, and shown in the accompanying drawings.

In the operation of electric furnaces, it is desirable to maintain the flow of current therethrough as steady as possible. For this purpose, many complicated devices have been developed which are costly and difficult to maintain and readily get out of order, owing to the numerous parts and adjustments required. Furthermore, due to the fact that heretofore regulators have not been provided with means whereby the length of impulse given to the controlled motor can be adjusted to meet the requirements of the furnace, previous regulators have resulted in an objectionable seesaw action of the electrode.

In my invention this seesaw action is eliminated by reason of the fact that an impulse is given to the electrode-controlling motor which is proportional to the amount of abnormality of the current flowing through the furnace, so that the impulse given to the motor is sufficient to restore the current through the furnace to the required value.

My invention comprises in general a moving element, the movement of which is controlled by electro-magnetic means directly in proportion to the amount of current flowing through the furnace. This moving element is adapted periodically to close the electrical circuit through a motor-controlling switch. This circuit is closed in one direction or another by the contact of this moving element with a plurality of contactors which have a uniform periodic motion. The duration of contact between the movable element and these contactors is dependent entirely upon the relative position of the movable element with respect to the contactors at the time of their meeting.

Furthermore, as a result of the engagement between the movable element and the contactor, the movable element is returned to a normal position, so that if the current conditions in the circuit have in the meantime returned to normal no further action of the regulator takes place; but if such a normal condition has not been restored in the meantime, the movable element will immediately assume the desired position relative to the contactors so that at their next meeting a further impulse in the proper direction is given to the electric motor controlling the furnace electrode.

The invention is illustrated in the drawings, of which—

Figure 1 represents a circuit diagram of my regulator;

Fig. 2 is an enlarged detail view of the movable element and the contactor;

Fig. 3 is a side view of the same;

Fig. 4 is an elevation of a modified form of movable element and contactors; and Fig. 5 is a side view of the modified form.

As shown in Fig. 1, 1 represents a current transformer in circuit with the electric furnace and having a winding 2 connected to a magnet 3. This magnet is adapted to control the movement of an armature 4 which is suspended from the pivot point 5 on a suitable arm 6. This arm is provided with an adjustable weight 7 whereby the sensibility of the arm 6 may be varied. The lower end of the arm 6 is adapted to extend into a body of liquid 8, such as oil, whereby the movement of the arm 6 can be dampened to some extent. A contact member 9 is suitably disposed on the arm 6 and is adapted to move according as the movement of the armature 4 is influenced by the magnet 3 in response to the current flowing from the furnace circuit. Adjacent the contact 9 are a plurality of contactors 10 and 11, shown more in detail in Fig. 2. These contactors 10 and 11 are in the form of curved metallic conducting plates disposed on the periphery of disks 12 and 13, which are of suitable insulating material. These disks are mounted on a suitable shaft 14 supported in a frame 15 and actuated by means of a pulley 16. These contact plates 10 and 11 extend toward each other over the edge of the disks 12 and 13 and their adjacent edges are curved as shown in Fig. 2. The arm 6 with the contact member 9 thereon is adapted normally to extend midway between the disks 12 and 13, so that in its normal middle position the contact member 9 does not engage with either of the contactor plates 10 and 11. The pivot 5 of the arm 6 is supported in a frame 17. On the lower portion of this frame a pair of spring members 18 and 19 are placed and adapted to engage at their outer ends with the contactor plates 10 and 11, as shown in Fig. 3.

As shown in Fig. 1, the contactor plates 10 and 11, through the spring members 18 and 19, are connected by suitable wires to electro-magnets 20 and 21, the operation of which controls the position of an arm 22 which at its lower end carries switch-contacting members 23 and 24 connected in circuit with an electrode-controlling motor 25. As the influence of magnet 20 or 21 predominates, the contacts 23 and 24 are moved to connect the motor in one relation or in a reverse relation with respect to the external circuits 26 and 27 which are adapted to be connected with the controller circuit through the switch 28.

In Fig. 4 a modified form of structure is shown, in which the magnet 3' controls an armature 4' and carries on its lower end two spaced conducting plates 10' and 11' thereon. These plates are insulated from each other by a portion of insulation 12'. One or the other of these plates 10' and 11' is adapted to contact with a conducting contactor plate surface 13' mounted on the insulating disk 14', which in turn is mounted on a shaft 15' and actuated by a pulley 16'. Current is collected from the contactor plate 13' by a spring-plate member 18'. In this modification the contactor plate members 10' and 11' are connected through the magnets 20 and 21.

In the operation of the device, by closing the switch 28 the power circuit 26 27 is adapted for use in connection with the controller circuit. The speed of rotation of the contactor plates 10 and 11 is adjusted at any desired value, which preferably has a definite relation to the current characteristics of the furnace circuit and with relation to the speed at which it is desired to move the electrodes of the furnace. In accordance with the variation in current in the winding 2, the magnet 3 moves the armature 4 and the contact member 9 in one direction or another. The contactor plates 10 and 11 are moved at a uniform speed continuously, and during their rotation one or the other of these plates is adapted to make contact along its inner edge with the contact member 9 when it is not in normal position. Owing to the camlike shape of the inner edge of each of these contactor plates, the duration of contact between either of these plates and the contact member 9 depends entirely and is proportionate to the amount by which the contact member 9 is moved from its normal position, and this variation from the normal position is determined in proportion as the amount of current flowing through the furnace is abnormal. By reason of the cam-shaped surface of the contactor plates 10 and 11, contact member 9 is moved back to a middle position at the end of each contact period; and if the magnetic influence of the magnet 3 on the armature 4 has at this time become normal, then the contacting member 9 will remain in its normal position. During the period of contact between member 9 and either of the contactor plates 10 and 11, the switch arm 22 is thrown in one direction or another by the magnets 20 and 21, whereby the connections of member 25 are reversed with respect to the power circuit, so that the motor can be operated in one direction or another to move the electrodes.

The modification described in respect to Fig. 4 illustrates a modified form of my invention in which the two disks 12 and 13 are eliminated and one disk is used. The two contactor plates are carried by the member moving under the influence of magnet 3'.

What I claim is:

1. A regulator for furnace electrodes, comprising a motor adapted to actuate said electrodes, a source of power adapted to be connected to said motor, a switch adapted to establish said connection, a magnet adapted to operate said switch, a plurality of uniformly moving contactors in circuit with said magnets, a movable contact element adjacent said uniformly moving contactors, and a magnet adapted to operate said movable contact, said magnet being electrically related to the circuit of the electrodes whereby its energization is in proportion to the strength and duration of current through the electrodes.

2. A regulator circuit for furnace electrodes, which comprises a motor in said circuit, a plurality of uniformly moving contactor plates in said circuit, a movable contact disposed operatively with respect to said contactor plates, magnetic means for actuating said movable contact to determine the duration of the engagement between the contact and the contactor plates at any instant, and means in circuit with said magnetic means for supplying said magnetic means with current proportional to the current flowing through the electrodes.

3. A regulator circuit for furnace electrodes, which comprises a cam-shaped contactor plate in said circuit having a uniform motion, a movable element normally disposed out of contact with said contactor plate, magnetic means adapted to actuate said movable element and move it into the path of movement of said contactor plate, a circuit connected with the magnetic means, said circuit being associated with the electrode circuit whereby the engagement between the movable element and the contactor plate and the duration of said engagement is determined by the strength of current in the electrodes.

4. A regulator circuit for furnace electrodes, which comprises a movable, cam-shaped contactor plate, a movable contact normally disposed adjacent said contactor plate but out of contact therewith, means for moving the contact into engagement with the contactor plate, means on said contactor plate for restoring the movable contact to normal position at the end of the engagement therebetween, and a circuit connecting the contact moving means with a current source associated with the electrode whereby the action of the contact moving means on the contact is proportional to the strength of current through the electrodes.

5. A regulator circuit for furnace electrodes, comprising a movable, cam-shaped contactor plate, a movable contact normally disposed adjacent said contactor plate but out of contact therewith, magnetic means for moving the contact into engagement with the contactor plate, means on said contactor plate for restoring the movable contact to normal position at the end of the engagement therebetween, and a circuit connecting said magnetic means with the source of current associated with the electrodes whereby the magnetic means is energized in proportion to the strength and duration of current flowing through the electrode.

6. A regulator for furnace electrodes, comprising a motor adapted to actuate said electrodes, a circuit connecting said motor, a switch adapted to apply said circuit to the motor and operate it in the desired direction, uniformly moving contactor plates in circuit with said switch, a magnetically-controlled contact normally disposed out of contact with said contactor plates, and means actuated by the variation in strength of current through the electrodes to cause the engagement of said contact with one of the contactor plates for a length of time proportional to the strength and duration of said current variation whereby the motor is actuated to operate the electrode.

SIDNEY BURROWES.